(12) United States Patent
Horne

(10) Patent No.: US 8,255,992 B2
(45) Date of Patent: *Aug. 28, 2012

(54) METHOD AND SYSTEM FOR DETECTING DEPENDENT PESTWARE OBJECTS ON A COMPUTER

(75) Inventor: Jefferson Delk Horne, Boulder, CO (US)

(73) Assignee: Webroot Inc., Broomfield, CO (US)

( * ) Notice: Subject to any disclaimer, the term of this patent is extended or adjusted under 35 U.S.C. 154(b) by 760 days.

This patent is subject to a terminal disclaimer.

(21) Appl. No.: 11/334,307

(22) Filed: Jan. 18, 2006

(65) Prior Publication Data

US 2007/0169197 A1    Jul. 19, 2007

(51) Int. Cl.
*H04L 29/06* (2006.01)

(52) U.S. Cl. ............... 726/22; 726/23; 726/24; 726/25; 726/26; 726/27; 713/187; 713/188; 717/124; 717/126; 717/131; 711/163; 714/38.1

(58) Field of Classification Search .................. None
See application file for complete search history.

(56) References Cited

U.S. PATENT DOCUMENTS

| | | | | |
|---|---|---|---|---|
| 5,485,575 | A | * | 1/1996 | Chess et al. ............... 714/38.13 |
| 5,623,600 | A | | 4/1997 | Ji et al. |
| 5,696,822 | A | * | 12/1997 | Nachenberg ............... 726/24 |
| 6,069,628 | A | | 5/2000 | Farry et al. |
| 6,073,241 | A | | 6/2000 | Rosenberg et al. |
| 6,092,194 | A | | 7/2000 | Touboul |
| 6,154,844 | A | | 11/2000 | Touboul |
| 6,167,520 | A | | 12/2000 | Touboul |
| 6,310,630 | B1 | | 10/2001 | Kulkarni et al. |
| 6,367,012 | B1 | | 4/2002 | Atkinson |
| 6,397,264 | B1 | | 5/2002 | Stasnick et al. |
| 6,460,060 | B1 | | 10/2002 | Maddalozzo, Jr. et al. |
| 6,480,962 | B1 | | 11/2002 | Touboul |
| 6,535,931 | B1 | | 3/2003 | Celi, Jr. |
| 6,611,878 | B2 | | 8/2003 | De Armas et al. |
| 6,633,835 | B1 | | 10/2003 | Moran et al. |
| 6,667,751 | B1 | | 12/2003 | Wynn et al. |
| 6,701,441 | B1 | | 3/2004 | Balasubramaniam et al. |
| 6,785,732 | B1 | | 8/2004 | Bates et al. |
| 6,804,780 | B1 | | 10/2004 | Touboul |
| 6,813,711 | B1 | | 11/2004 | Dimenstein |

(Continued)

FOREIGN PATENT DOCUMENTS

WO PCT/US2006/008883    10/2007

(Continued)

OTHER PUBLICATIONS

U.S. Appl. No. 11/086,873, filed Mar. 22, 2005, Michael Christopher Wilson.

(Continued)

*Primary Examiner* — Syed A. Zia
(74) *Attorney, Agent, or Firm* — Cooley LLP

(57) ABSTRACT

A system and method for detecting dependent pestware objects on a computer is described. One illustrative embodiment detects a primary pestware process in an executable memory of the computer, the primary pestware process including an associated check value by which the primary pestware process can be identified; locates, at a predetermined offset in the executable memory relative to the check value, a pointer to a string, the string comprising an address of a secondary pestware object stored on the computer; and follows the pointer to the string to ascertain the address of the secondary pestware object.

20 Claims, 5 Drawing Sheets

U.S. PATENT DOCUMENTS

| | | | |
|---|---|---|---|
| 6,829,654 B1 | 12/2004 | Jungek | |
| 6,965,968 B1 | 11/2005 | Touboul | |
| 6,971,019 B1* | 11/2005 | Nachenberg | 713/188 |
| 7,058,822 B2 | 6/2006 | Edery et al. | |
| 7,093,239 B1 | 8/2006 | van der Made | |
| 7,216,367 B2* | 5/2007 | Szor | 726/25 |
| 7,234,167 B2* | 6/2007 | Teblyashkin et al. | 726/24 |
| 7,334,263 B2* | 2/2008 | Szor | 726/22 |
| 7,349,931 B2* | 3/2008 | Horne | 1/1 |
| 7,363,506 B2* | 4/2008 | Carbone | 713/188 |
| 7,370,360 B2 | 5/2008 | van der Made | |
| 7,409,717 B1* | 8/2008 | Szor | 726/24 |
| 7,418,729 B2 | 8/2008 | Szor | |
| 7,552,479 B1 | 6/2009 | Conover | |
| 7,571,476 B2* | 8/2009 | Horne | 726/22 |
| 7,591,016 B2* | 9/2009 | Horne | 726/22 |
| 7,620,992 B2* | 11/2009 | Monastyrsky et al. | 726/24 |
| 7,624,449 B1 | 11/2009 | Perriot | |
| 7,647,636 B2* | 1/2010 | Polyakov et al. | 726/24 |
| 7,861,296 B2* | 12/2010 | Costea et al. | 726/22 |
| 7,925,888 B1* | 4/2011 | Nachenberg | 713/188 |
| 7,971,249 B2* | 6/2011 | Horne | 726/22 |
| 8,065,664 B2* | 11/2011 | Burtscher | 717/126 |
| 8,079,032 B2* | 12/2011 | Nichols | 718/100 |
| 8,151,355 B2* | 4/2012 | Fossen et al. | 726/24 |
| 2003/0046558 A1* | 3/2003 | Teblyashkin et al. | 713/188 |
| 2003/0065926 A1 | 4/2003 | Schultz | |
| 2003/0115479 A1 | 6/2003 | Edwards | |
| 2003/0159070 A1 | 8/2003 | Mayer | |
| 2003/0217286 A1* | 11/2003 | Carmona et al. | 713/200 |
| 2003/0217287 A1 | 11/2003 | Kruglenko | |
| 2003/0233566 A1* | 12/2003 | Kouznetsov et al. | 713/200 |
| 2004/0015712 A1* | 1/2004 | Szor | 713/200 |
| 2004/0024864 A1 | 2/2004 | Porras | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0068664 A1* | 4/2004 | Nachenberg et al. | 713/200 |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0225877 A1 | 11/2004 | Huang | |
| 2004/0255165 A1* | 12/2004 | Szor | 713/201 |
| 2005/0027686 A1 | 2/2005 | Shipp | |
| 2005/0055558 A1* | 3/2005 | Carmona | 713/188 |
| 2005/0138433 A1 | 6/2005 | Linetsky | |
| 2005/0188272 A1* | 8/2005 | Bodorin et al. | 714/38 |
| 2005/0204205 A1* | 9/2005 | Ring et al. | 714/47 |
| 2005/0223238 A1* | 10/2005 | Schmid et al. | 713/188 |
| 2005/0229250 A1* | 10/2005 | Ring et al. | 726/23 |
| 2005/0283838 A1* | 12/2005 | Saito | 726/24 |
| 2006/0117387 A1 | 6/2006 | Gunsalus | |
| 2006/0130141 A1* | 6/2006 | Kramer et al. | 726/23 |
| 2006/0200863 A1* | 9/2006 | Ray et al. | 726/24 |
| 2006/0212940 A1* | 9/2006 | Wilson | 726/22 |
| 2006/0236397 A1 | 10/2006 | Horne | |
| 2007/0006137 A1* | 1/2007 | Savagaonkar et al. | 717/106 |
| 2007/0039052 A1* | 2/2007 | Chandnani | 726/24 |
| 2007/0094496 A1* | 4/2007 | Burtscher | 713/164 |
| 2007/0101431 A1* | 5/2007 | Clift et al. | 726/24 |
| 2007/0168285 A1* | 7/2007 | Girtakovskis et al. | 705/50 |
| 2010/0306847 A1* | 12/2010 | Lambert et al. | 726/24 |

FOREIGN PATENT DOCUMENTS

| | | |
|---|---|---|
| WO | PCT/US2007/067078 | 11/2007 |
| WO | PCT/US2007/067082 | 11/2007 |
| WO | PCT/US07/60708 | 9/2008 |

OTHER PUBLICATIONS

U.S. Appl. No. 11/105,977, filed Apr. 14, 2005, J. Horne.

U.S. Appl. No. 11/106,122, filed Apr. 14, 2005, J Horne.

U.S. Appl. No. 11/259,706, filed Oct. 26, 2005, Jefferson D. Horne.

U.S. Appl. No. 11/258,711, filed Oct. 26, 2005, Jefferson D. Horne et al.

U.S. Appl. No. 11/334,318, filed Jan. 18, 2006, Jefferson D. Horne, et al.

U.S. Appl. No. 11/334,317, filed Jan. 18, 2006, Jefferson D. Horne.

Codeguru, Three Ways to Inject Your Code Into Another Process, by Robert Kuster, Aug. 4, 2003, 22 pgs.

Codeguru, Managing Low-Level Keyboard Hooks With the Windows API for VB .Net, by Paul Kimmel, Apr. 18, 2004, 10 pgs.

Codeguru, Hooking the Keyboard, by Anoop Thomas, Dec. 13, 2001, 6 pgs.

Illusive Security, Wolves in Sheep's Clothing: malicious DLLs Injected Into trusted Host Applications, Author Unknown, http://home.arcor.de/scheinsicherheit/dll.htm 13 pgs.

DevX.com, Intercepting Systems API Calls, by Seung-Woo Kim, May 13, 2004, 6 pgs.

Microsoft.com, How to Subclass a Window in Windows 95, Article ID 125680, Jul. 11, 2005, 2 pgs.

MSDN, Win32 Hooks by Kyle Marsh, Jul. 29, 1993, 15 pgs.

PCT Search Report, PCT/US05/34874, Jul. 5, 2006, 7 Pages.

Hruska J; "Virus Detection" European Conference on Security and Detection, XX, XX, Apr. 1997; pp. 128-131; XP000828109.

Yi-Min Wang et al.; "Detecting Stealth Software with Strider Ghostbuster" Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.

Endrijonis, Janet; Chapter 3, "Microcom Virex for the PC version 2.0"; RxPC The Anti-Virus Handbook; 1993; pp. 25-43; TAB Books; Blue Ridge Summit, PA.

\* cited by examiner

METHOD AND SYSTEM FOR DETECTING DEPENDENT PESTWARE OBJECTS ON A COMPUTER

RELATED APPLICATIONS

The present application is related to the following commonly owned and assigned applications: U.S. application Ser. No. 11/334,317, "Method and System for Detecting Obfuscatory Pestware in a Computer Memory," filed herewith; U.S. application Ser. No. 11/105,978, "System and Method for Scanning Obfuscated Files for Pestware"; U.S. application Ser. No. 11/105,977, "System and Method for Scanning Memory for Pestware Offset Signatures"; U.S. application Ser. No. 11/106,122, "System and Method for Scanning Memory for Pestware"; and U.S. application Ser. No. 11/259,706, "System and Method for Neutralizing Pestware That Is Loaded by a Desirable Process"; each of which is incorporated herein by reference in its entirety.

FIELD OF THE INVENTION

The invention relates generally to the detection of pestware or malware on computers. More specifically, but without limitation, the invention relates to methods and systems for detecting pestware objects that are dependent on other pestware.

BACKGROUND OF THE INVENTION

Protecting personal computers against a never-ending onslaught of "pestware" such as viruses, Trojan horses, spyware, adware, and downloaders on personal computers has become vitally important to computer users. Some pestware is merely annoying to the user or degrades system performance. Other pestware is highly malicious. Many computer users depend on anti-pestware software that attempts to detect and remove pestware automatically.

Anti-pestware software typically scans running processes in memory and files contained on storage devices such as disk drives, comparing them, at expected locations, against a set of "signatures" that identify specific, known types of pestware. Once found, the pestware can often be removed from the system. In some situations, however, merely detecting a particular pestware process and removing it from the system is insufficient. This can result where the pestware is made up of a primary part and a secondary (dependent) part. For example, the secondary part may be executed briefly at startup—just long enough to launch (or, if necessary, reinstall) the primary part. Consequently, a scan of executable memory is unlikely to detect the secondary part. If the secondary part reinstalls the primary part after the primary part has been detected and deleted, the original pestware infestation recurs.

This problem is worsened where the pestware conceals or "guises" the identity and location on the computer of the secondary part. For example, the pestware may alter the file name of the secondary part in a random fashion each time the pestware is executed. Using a conventional signatures-based approach to detect such a secondary pestware object is like trying to hit a moving target. As a result, conventional anti-pestware software may be ineffective in detecting and removing secondary or dependent pestware objects.

It is thus apparent that there is a need in the art for an improved method and system for detecting dependent pestware objects on a computer.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the invention include methods and systems for detecting dependent pestware objects on a computer. One illustrative embodiment is a method comprising detecting a primary pestware process in an executable memory of the computer, the primary pestware process including an associated check value by which the primary pestware process can be identified; locating, at a predetermined offset in the executable memory relative to the check value, a pointer to a string, the string comprising an address of a secondary pestware object stored on the computer; and following the pointer to the string to ascertain the address of the secondary pestware object.

Another illustrative embodiment is a system for detecting pestware on a computer. In this embodiment, a detection module of the system for detecting pestware is configured to detect a primary pestware process in an executable memory of the computer, the primary pestware process including an associated check value by which the primary pestware process can be identified; locate, at a predetermined offset in the executable memory relative to the check value, a pointer to a string, the string comprising an address of a secondary pestware object stored on the computer; and follow the pointer to the string to ascertain the address of the secondary pestware object. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

"Pestware," as used herein, refers to any program that damages or disrupts a computer system or that collects or reports information about a person or an organization. Examples include, without limitation, viruses, worms, Trojan horses, spyware, adware, and downloaders. A pestware object that depends on or that is in some way associated with another, primary pestware object (herein interchangeably "dependent pestware object" or "secondary pestware object") can be detected and removed if effective pestware scanning techniques are augmented with appropriate side information.

The side information that a particular type of pestware might be composed of a primary pestware process and a dependent pestware object can be exploited to locate and remove the dependent pestware object. Specifically, the anti-pestware system may first detect a primary pestware process in executable memory. The techniques for detecting the primary pestware process may be, for example, those described in the incorporated references listed in Related Applications. In detecting the primary pestware process, the anti-pestware system may locate algorithm code, a string (e.g., a name, uniform resource locator—URL), or any other data within the pestware process by which the particular pestware can be identified. Herein, such identifying data will be called a "check value."

The anti-pestware system may then use the a priori knowledge that, at a predetermined offset in executable memory relative to the check value, a pointer to (address of) a string may be found, the string comprising an address of a dependent pestware object stored somewhere on the computer. For example, the string may be the directory path and file name of a file stored on a hard disk drive. Even if the pestware frequently changes the string and the corresponding directory path and file name of the secondary pestware object, the pointer to the string may be followed to ascertain the current value of the string and, hence, the directory path and file name of the secondary pestware object. Those skilled in the art will recognize that the secondary pestware object may be either executable (e.g., a "time bomb" application that executes at a certain time when called by a primary pestware process) or non-executable (e.g., an encrypted data file to which a "keylogger" primary pestware process writes a user's keystrokes as he types).

Once the secondary pestware object has been detected and located, the anti-pestware system can perform various optional steps. For example, the anti-pestware system may issue a notification that pestware has been found on the protected computer. Further, the anti-pestware system may follow the string (address) in the primary pestware process to the dependent pestware object and remove it from the system, perhaps contingent on user confirmation.

Figure 1:
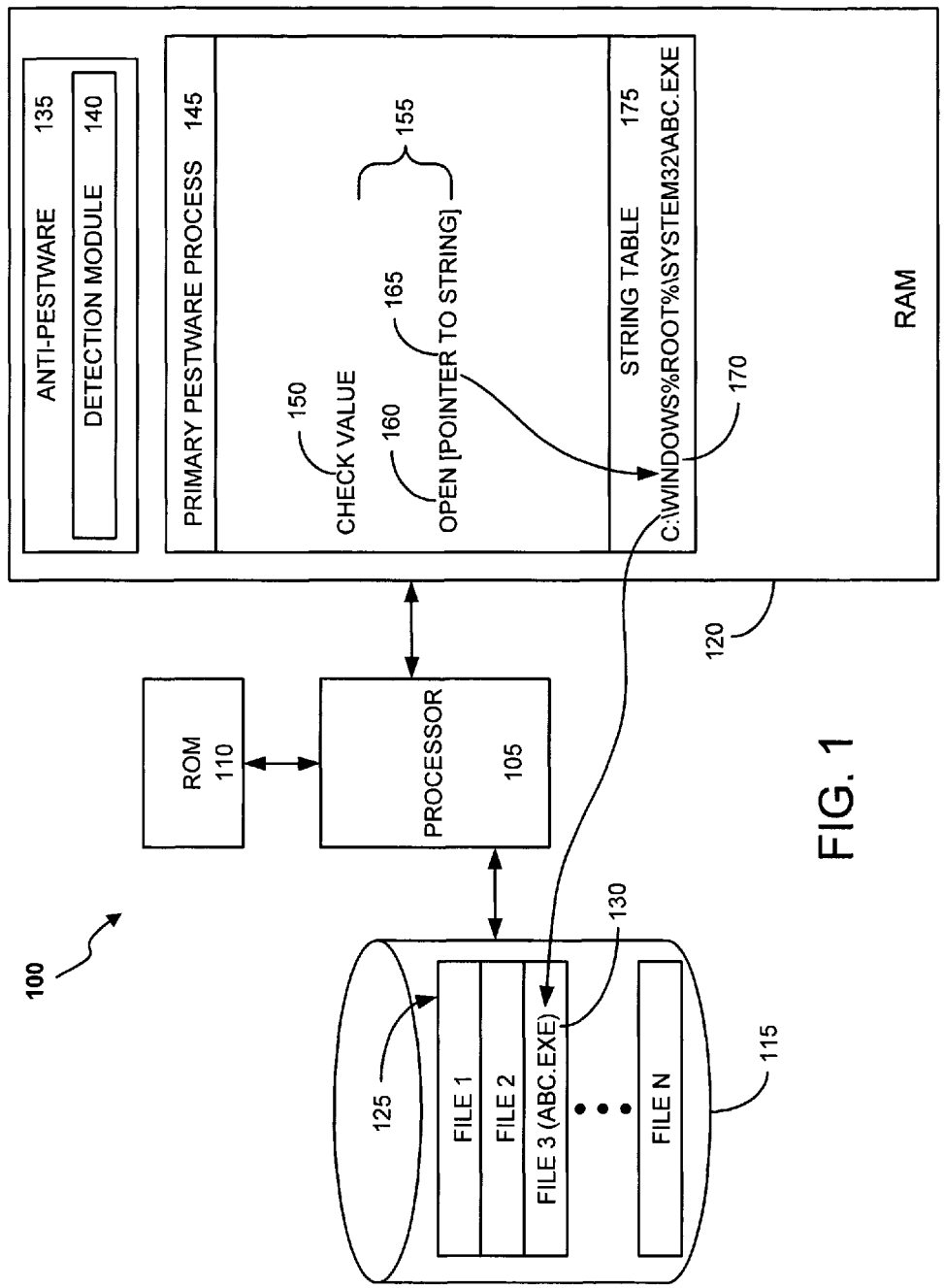
FIG. 1 is a block diagram of a computer protected by a system for detecting pestware, in accordance with an illustrative embodiment of the invention.

Referring now to the drawings, where like or similar elements are designated with identical reference numerals throughout the several views, FIG. 1 is a block diagram of a computer 100 protected by a system for detecting pestware ("anti-pestware"), in accordance with an illustrative embodiment of the invention. "Computer" is used herein to mean any type of electronic device that includes computing functionality, including, without limitation, personal computers (PCs), laptop computers, notebook computers, handheld computers, personal digital assistants (PDAs), servers, and a wide variety of other electronic devices that include a processor and a memory containing program instructions.

In FIG. 1, processor 105 may communicate with read-only memory (ROM) 110 (e.g., a ROM BIOS), file storage device 115, and random-access memory (RAM) 120. File storage device (e.g., a disk drive), may contain a set of N files 125, one of which—FILE 3 ("ABC.EXE") in this example—is dependent pestware object (secondary pestware object) 130. RAM 120 may contain a number of running processes, only two of which are shown for simplicity in FIG. 1: anti-pestware 135, comprising detection module 140, and primary pestware process 145. Within primary pestware process 145 reside check value 150 and, at a predetermined offset 155 from check value 150, a call 160 to open, via pointer 165 (i.e., an address), secondary pestware object 130. Pointer 165 points to string 170, which may reside in string table 175. As those skilled in the art are aware, string table 175 is a collection of strings used by primary pestware process 145. String 170 comprises an address on computer 100 of secondary pestware object 130. In the illustrative example of FIG. 1, dependent pestware object 130 has the directory path and file name "C:\WINDOWS%ROOT%\SYSTEM32\ABC.EXE."

Though, in the example of FIG. 1, string 170 is based on operating systems supplied by Microsoft Corp. and sold under the trade name "Windows," the principles of the invention are not limited to those operating systems and may be applied to any other operating system.

Anti-pestware 135 comprises a system for detecting pestware on computer 100. Though not shown in FIG. 1, anti-pestware 135 may include other modules for notifying a user that pestware has been detected, shielding computer 100 from pestware, removing pestware from computer 100, or a combination thereof. Detection module 140 is an aspect of anti-pestware 135 that scans the memory of computer 100 (e.g., RAM 120, file storage device 115, or both) to detect pestware. Though anti-pestware 135 is shown in FIG. 1 as being executed from RAM 120, anti-pestware may, in general, be implemented in software, firmware, hardware, or any combination thereof. In one illustrative embodiment, anti-pestware 135 is implemented as an executable application program that resides on file storage device 115 and that is loaded into and executed from RAM 120 by processor 105.

Figure 2:
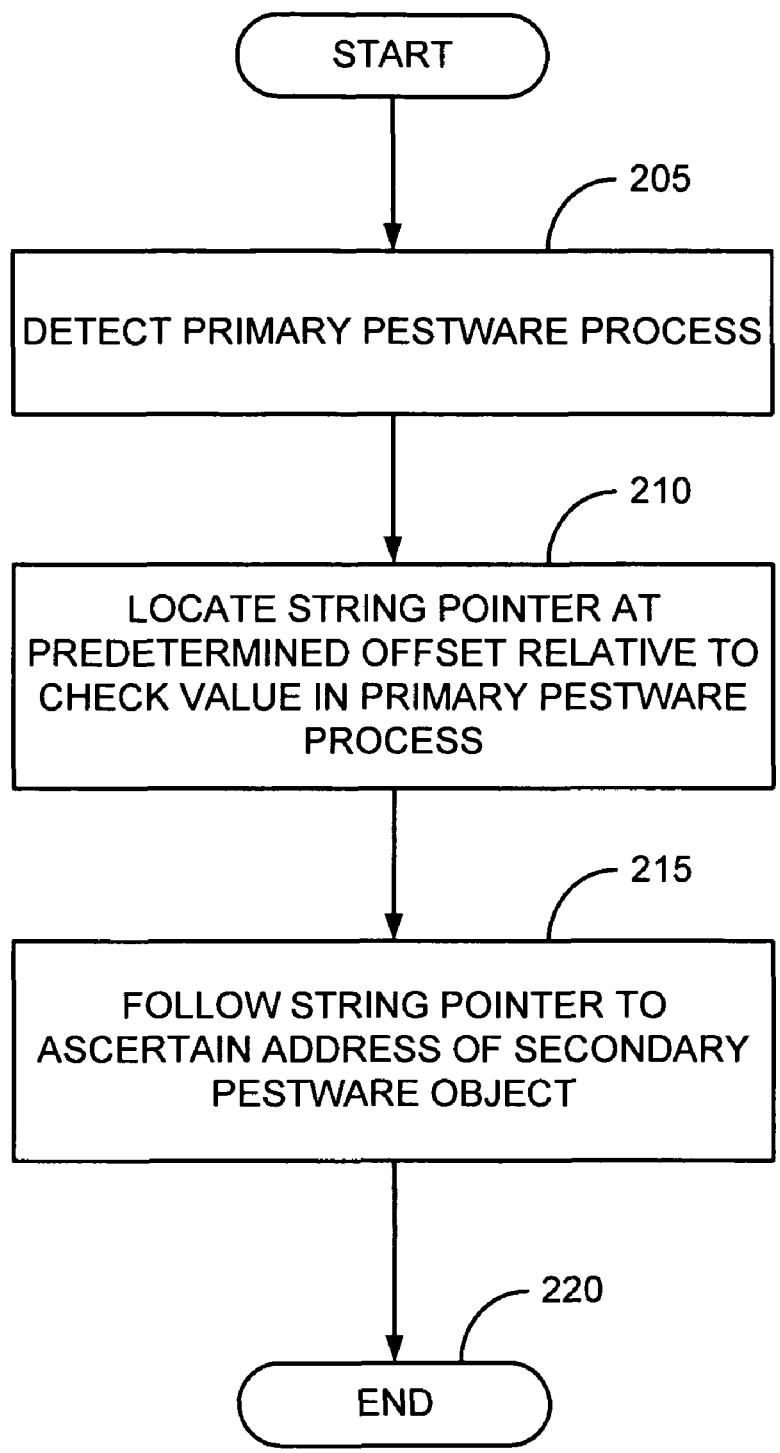
FIG. 2 is a flowchart of the operation of a system for detecting pestware, in accordance with an illustrative embodiment of the invention.

FIG. 2 is a flowchart of the operation of anti-pestware 135, in accordance with an illustrative embodiment of the invention. At 205, detection module 140 may employ techniques such as those described in the incorporated references in Related Applications or any other appropriate pestware detection techniques to detect primary pestware process 145. At 210, detection module 140 may use its side information to locate pointer 165 at predetermined offset 155 relative to check value 150. Detection module 140 may then, at 215, follow pointer 165 to string 170 to ascertain the address, on computer 100, of secondary pestware object 130. At 220, the process may terminate.

Figure 3:
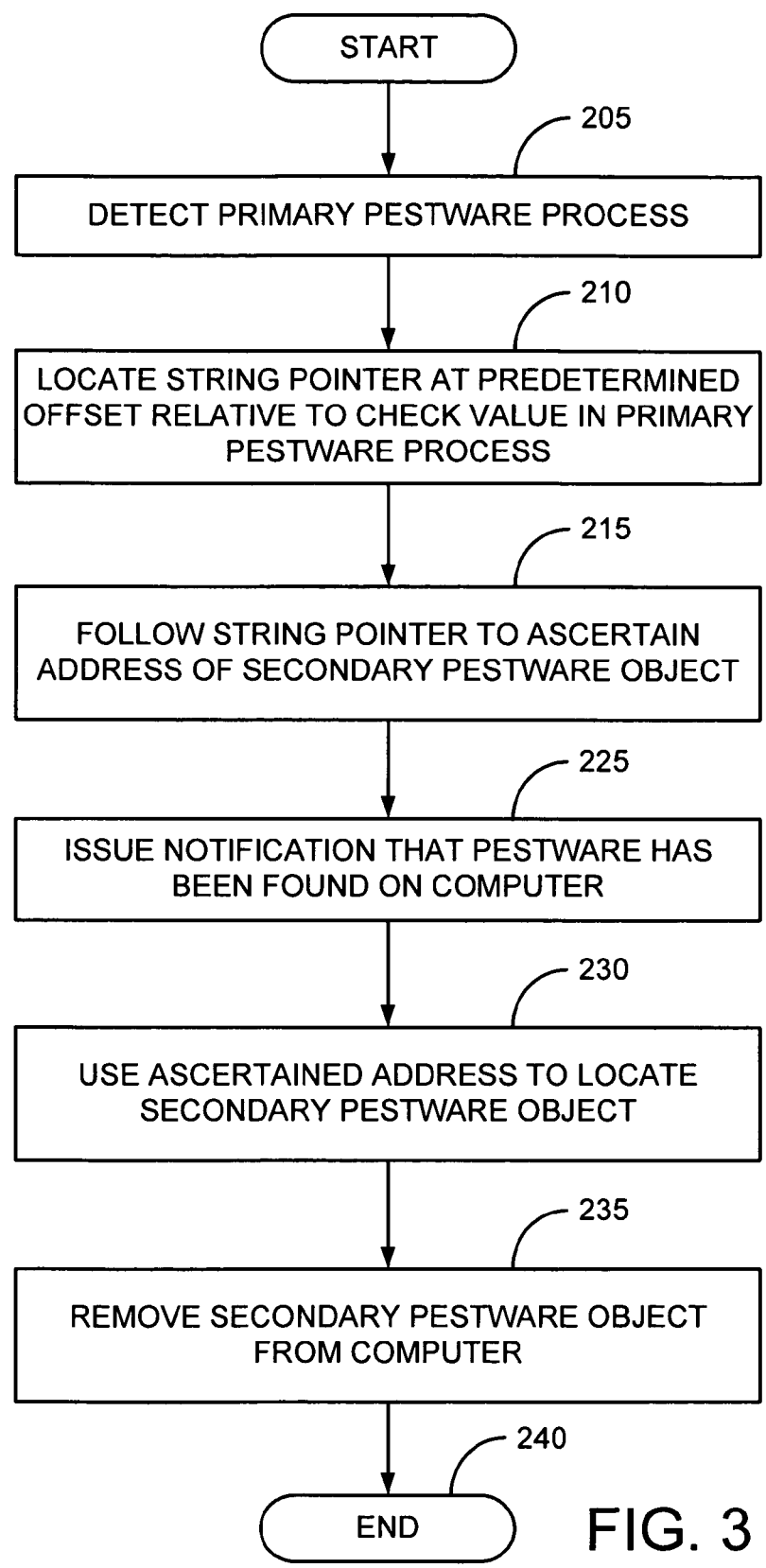
FIG. 3 is a flowchart of the operation of a system for detecting pestware, in accordance with another illustrative embodiment of the invention.

FIG. 3 is a flowchart of the operation of anti-pestware 135, in accordance with another illustrative embodiment of the invention. The embodiment of FIG. 3 includes additional optional steps 225, 230, and 235. At 225, detection module 140 may issue a notification (e.g., display a message on a display of computer 100) that pestware has been found on computer 100. At 230, detection module 140 may use the address ascertained at 215 (string 170) to locate dependent pestware object 130. At 235, anti-pestware 135 may remove dependent pestware object 130 from computer 100. At 240, the process may terminate.

Figure 4A:
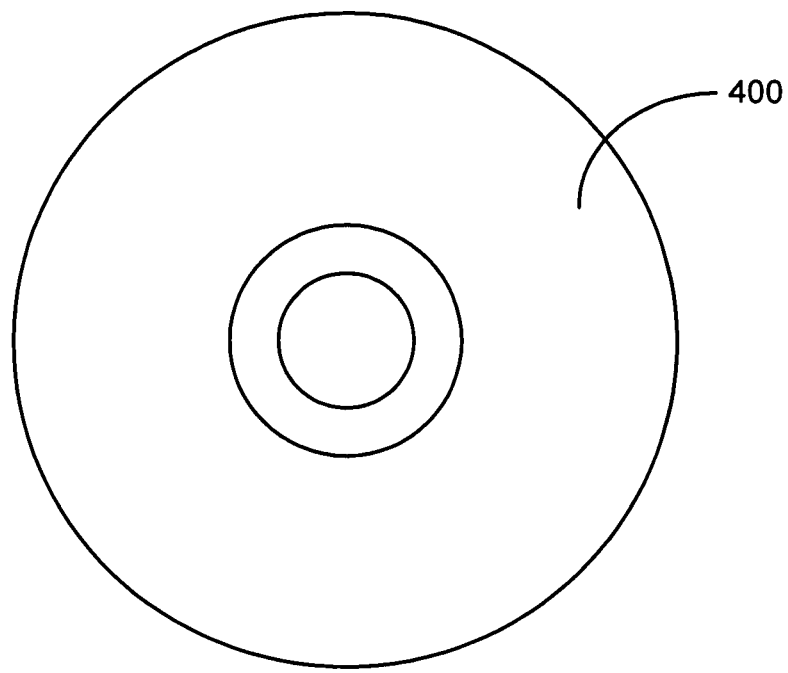
FIG. 4A is an illustration of a computer-readable storage medium containing program instructions to detect pestware on a computer, in accordance with an illustrative embodiment of the invention.

FIG. 4A is an illustration of a computer-readable storage medium 400 containing program instructions (anti-pestware 135) to detect pestware on computer 100, in accordance with an illustrative embodiment of the invention. Though FIG. 4A depicts, by way of illustration, an optical disc such as a CD-ROM, computer-readable storage medium 400 may be any kind of non-volatile, computer-readable storage medium capable of storing program instructions, including, without limitation, flash memory, ROM, optical discs, and magnetic disks.

Figure 4B:
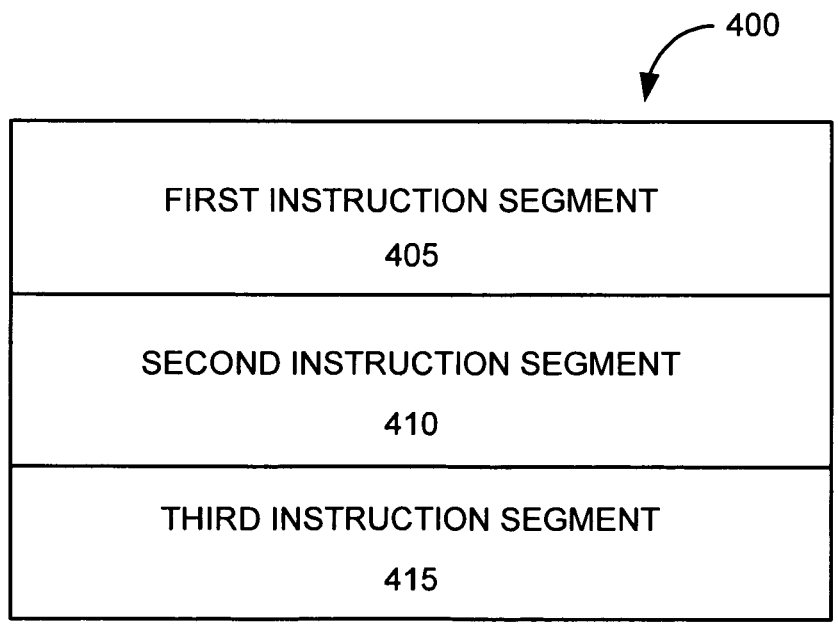
FIG. 4B is a diagram of the elements of a computer-readable storage medium containing program instructions to detect pestware on a computer, in accordance with an illustrative embodiment of the invention.

FIG. 4B is a diagram of the elements of a computer-readable storage medium 400 containing program instructions to detect pestware (anti-pestware 135) on computer 100, in accordance with an illustrative embodiment of the invention. Computer-readable storage medium 400 may be comprised of a first instruction segment 405 that detects primary pestware process 145 in an executable memory (e.g., RAM 120) of computer 100, primary pestware process 145 including an associated check value 150 by which primary pestware process 145 can be identified. Computer-readable storage medium 400 may be further comprised of a second instruction segment 410 that locates, at a predetermined offset 155 in the executable memory relative to check value 150, a pointer 165 to a string 170, the string 170 comprising an address of secondary pestware object 130 on computer 100. Computer-readable storage medium 400 may be further comprised of a third instruction segment 415 that follows pointer 165 to string 170 to ascertain the address of secondary pestware object 130 on computer 100.

Figure 4C:
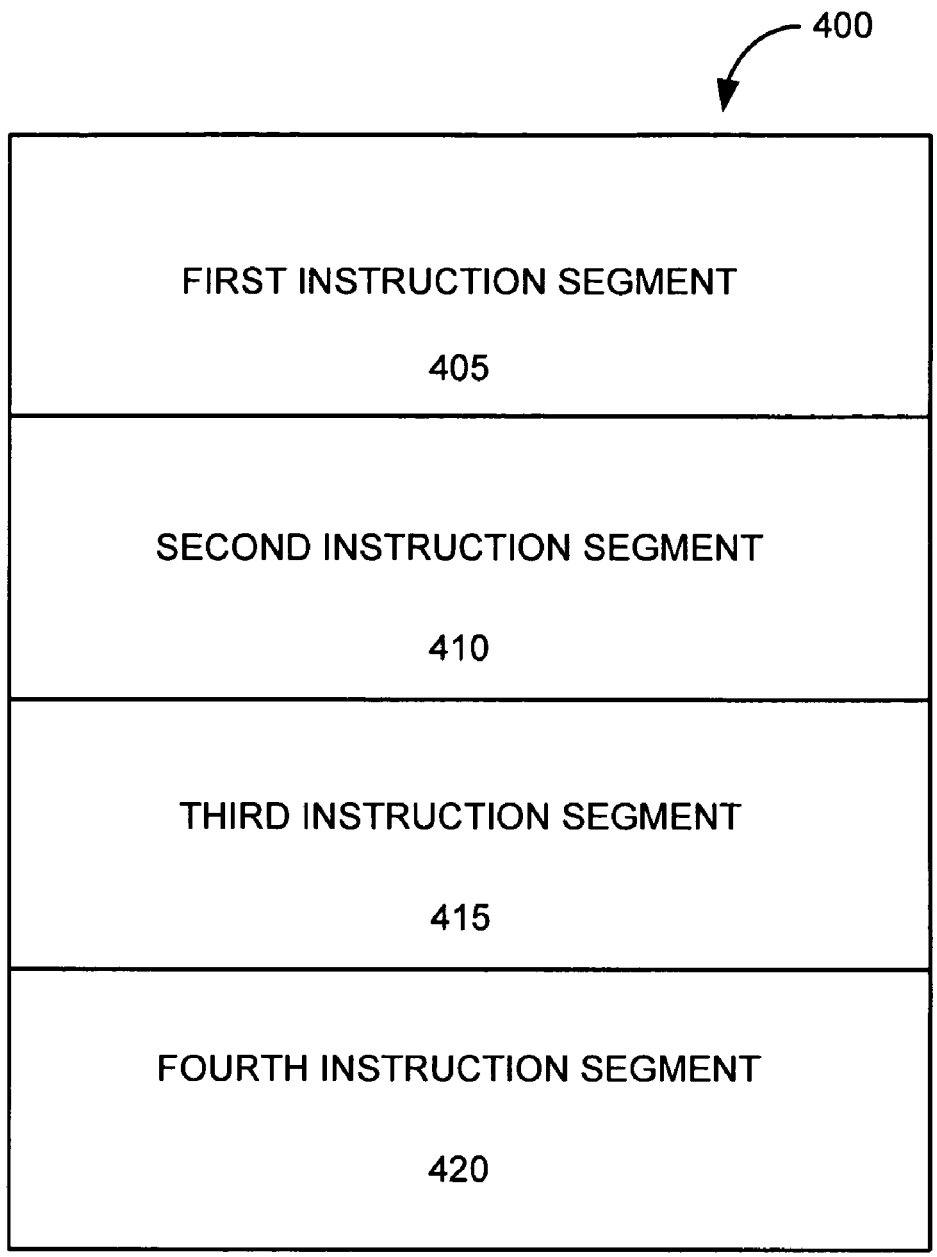
FIG. 4C is a diagram of the elements of a computer-readable storage medium containing program instructions to detect pestware on a computer, in accordance with another illustrative embodiment of the invention.

FIG. 4C is a diagram of the elements of a computer-readable storage medium 400 containing program instructions to detect pestware (anti-pestware 135) on computer 100, in accordance with another illustrative embodiment of the invention. In FIG. 4C, in addition to first, second, and third instruction segments 405, 410, and 415, respectively, a fourth instruction segment 420 may perform such optional steps as issuing a notification that pestware has been found on computer 100, using the ascertained address of dependent pestware 130 (string 170) to locate dependent pestware process 130, and removing dependent pestware process 130 from computer 100.

In conclusion, the present invention provides, among other things, a method and system for detecting dependent or secondary pestware objects on a computer. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for detecting pestware on a computer, comprising:
   detecting a primary pestware process in an executable memory of the computer, the primary pestware process including an associated check value by which the primary pestware process can be identified;
   locating, at a predetermined offset in the executable memory relative to the check value, a pointer to a string, wherein the pointer to the string is a variable that is located within the executable memory occupied by the primary pestware process and whose value is the address of the string, the string comprising an address of a secondary pestware object stored on the computer, wherein the string is located in the executable memory occupied by the primary pestware process;
   following the pointer to the string to ascertain the address of the secondary pestware object;
   using the ascertained address to locate the secondary pestware object; and
   removing the secondary pestware object from the computer.

2. The method of claim 1, further comprising issuing a notification that pestware has been found on the computer.

3. The method of claim 1, wherein the secondary pestware object is executable.

4. The method of claim 1, wherein the secondary pestware object is non-executable.

5. The method of claim 1, wherein the pointer comprises a double word that acts as a string verifier for a long string.

6. The method of claim 1, wherein the string resides in a string table within the primary pestware process.

7. A system for detecting pestware, comprising:
   a processor; and
   a memory containing a plurality of program instructions configured to cause the processor to:
      detect a primary pestware process in an executable memory of the computer, the primary pestware process including an associated check value by which the primary pestware process can be identified;
      locate, at a predetermined offset in the executable memory relative to the check value, a pointer to a string, wherein the pointer to the string is a variable that is located within the executable memory occupied by the primary pestware process and whose value is the address of the string, the string comprising an address of a secondary pestware object stored on the computer, wherein the string is located in the executable memory occupied by the primary pestware process;
      follow the pointer to the string to ascertain the address of the secondary pestware object;
      cause the processor to use the ascertained address to locate the secondary pestware object; and
      remove the secondary pestware object from the computer.

8. The system of claim 7, wherein the plurality of program instructions are further configured to cause the processor to issue a notification that pestware has been found on the computer.

9. The system of claim 7, wherein the secondary pestware object is executable.

10. The system of claim 7, wherein the secondary pestware object is non-executable.

11. The system of claim 7, wherein the pointer comprises a double word that acts as a string verifier for a long string.

12. The system of claim 7, wherein the string resides in a string table within the primary pestware process.

13. A system for detecting pestware on a computer, comprising:
   means for detecting a primary pestware process in an executable memory of the computer, the primary pestware process including an associated check value by which the primary pestware process can be identified;
   means for locating, at a predetermined offset in the executable memory relative to the check value, a pointer to a string, wherein the pointer to the string is a variable that is located within the executable memory occupied by the primary pestware process and whose value is the address of the string, the string comprising an address of a secondary pestware object stored on the computer, wherein the string is located in the executable memory occupied by the primary pestware process;
   means for following the pointer to the string to ascertain the address of the secondary pestware object;
   means for locating the secondary pestware object based on the ascertained address; and
   means for removing the secondary pestware object from the computer.

14. The system of claim 13, further comprising:

means for issuing a notification that pestware has been found on the computer.

15. A computer-readable storage medium containing program instructions to detect pestware on a computer, comprising:

a first instruction segment configured to identify a primary pestware process in an executable memory of the computer, the primary pestware process including an associated check value by which the primary pestware process can be identified;

a second instruction segment configured to locate, at a predetermined offset in the executable memory relative to the check value, a pointer to a string, wherein the pointer to the string is a variable that is located within the executable memory occupied by the primary pestware process and whose value is the address of the string, the string comprising an address of a secondary pestware object stored on the computer, wherein the string is located in the executable memory occupied by the primary pestware process;

a third instruction segment configured to follow the pointer to the string to ascertain the address of the secondary pestware object; and a fourth instruction segment configured to locate the secondary pestware object based on the ascertained address and to remove the secondary pestware object from the computer.

16. The computer-readable storage medium of claim 15, further comprising:

a fifth instruction segment configured to issue a notification that pestware has been found on the computer.

17. The computer-readable storage medium of claim 15, wherein the secondary pestware object is executable.

18. The computer-readable storage medium of claim 15, wherein the secondary pestware object is non-executable.

19. The computer-readable storage medium of claim 15, wherein the pointer comprises a double word that acts as a string verifier for a long string.

20. The computer-readable storage medium of claim 15, wherein the string resides in a string table within the primary pestware process.

* * * * *